United States Patent
Charlet et al.

(10) Patent No.: US 7,081,988 B2
(45) Date of Patent: Jul. 25, 2006

(54) OPTICAL AMPLIFIER, COMMUNICATION SYSTEM AND METHOD FOR CONTROL TILT OF A COMMUNICATION SYSTEM

(75) Inventors: Gabriel Charlet, Villiers-le-Bacle (FR); Christian Simonneau, Antony (FR)

(73) Assignee: Alcatel, Paris (FR)

( * ) Notice: Subject to any disclaimer, the term of this patent is extended or adjusted under 35 U.S.C. 154(b) by 90 days.

(21) Appl. No.: 10/827,303

(22) Filed: Apr. 20, 2004

(65) Prior Publication Data

US 2004/0240042 A1  Dec. 2, 2004

(30) Foreign Application Priority Data

May 13, 2003 (EP) ................... 03291119

(51) Int. Cl.
*H01S 3/00* (2006.01)
*H04B 10/12* (2006.01)

(52) U.S. Cl. .............. 359/337.11; 359/337.13
(58) Field of Classification Search ............ 359/337.1, 359/337.11, 337.13
See application file for complete search history.

(56) References Cited

U.S. PATENT DOCUMENTS

| 6,160,659 | A | 12/2000 | Kinoshita |
| 6,437,906 | B1 | 8/2002 | Di Pasquale et al. |
| 6,535,330 | B1 * | 3/2003 | Lelic et al. ............ 359/337.13 |
| 2002/0063950 | A1 | 5/2002 | Lee et al. |

* cited by examiner

*Primary Examiner*—Mark Hellner
(74) *Attorney, Agent, or Firm*—Sughrue Mion, PLLC

(57) ABSTRACT

The invention discloses an optical amplifier (18) that amplifies signal light in a signal band in a fiber optic transmission system (10) having at least first and second optically pumped signal light gain amplifying stages (30),
 a tilt controller (40) linked to a control unit,
 a optical monitor (34) analyzing signal powers,
 characterized in that the amplified spontaneous emission of the optical amplifier (18) is measured at two extreme wavelengths of the signal band to derive control signals (44) for at least the tilt controller (40).

8 Claims, 3 Drawing Sheets

OPTICAL AMPLIFIER, COMMUNICATION SYSTEM AND METHOD FOR CONTROL TILT OF A COMMUNICATION SYSTEM

BACKGROUND OF THE INVENTION

The invention is based on a priority application EP 03 291 119.0 which is hereby incorporated by reference.

The present invention relates to an optical amplifier and an optical communication system which incorporate the method and device to adjust gain tilt of the optical amplifier.

Optical communication systems typically use wavelength-division multiplexing to increase transmission capacity. More specifically, a plurality of signal lights each having a different wavelength are multiplexed together into a wavelength division multiplexed (WDM) signal light. The WDM signal light is transmitted over a transmission line, and then demultiplexed at the other end of the transmission line so that the individual signal lights can be individually received. The transmission line is usually a single optical fiber.

An optical amplifier is typically used in such an optical communication system to amplify the WDM signal light, since an optical amplifier has a relatively broad band.

More specifically, the broad band of the optical amplifier allows each of the individual signal lights in the WDM signal light to be amplified.

Generally, an optical amplifier includes an optical amplifying medium, such as an erbium-doped fiber (EDF). The WDM signal light travels through the optical amplifying medium. The optical amplifier also includes a light source, such as a laser diode, which provides pump light to the optical amplifying medium. The pump light causes the WDM signal light to be amplified as the light signal travels through the optical amplifying medium. Repeaters, each have an optical amplifier, are typically interposed into the transmission line to transmit a WDM signal light over a long distance.

Moreover, the gain of an optical amplifier is dependent on the wavelength of the amplified signal. This dependence is defined as the "gain tilt" of the optical amplifier. Therefore, when a WDM signal light is amplified by the optical amplifier, each of the individual signal lights multiplexed together may be amplified with a different gain. This gain tilt of the optical amplifier must be considered when using an optical amplifier to amplify a WDM signal light.

Therefore, the gain tilt of an optical amplifier should be monitored or controlled when using the optical amplifier in an optical communication system, which used wavelength division multiplexing.

Actually the tilt of an optical amplifier is controlled by adjusting a VOA (variable optical attenuator) in the interstage of the amplifier. As described also in FIG. 2. In a long haul system using more than 10 amplifiers, the tilt at the end of the system can be very important (more than 10 dB) and the system performance is degraded.

The feedback signal for a VASC (Variable Slope Compensator) in the interstage of the EDFA is still not yet clearly defined.

The spectrum flatness of the optical amplifier is adjusted by measuring the gain of the amplifier. If the amplifier works at his nominal gain, the gain is spectrally flat. Power measurements at the input, output and interstage of the amplifier allow to adjust the gain of the amplifier to his nominal gain by changing the attenuation of the VOA.

This technique allow to reduce the tilt to approximately 1.5 dB per amplifier (due to the uncertainty of the power measurement at the input/output/interstage of the amplifier).

But in a very long haul system of approximately 1000 km (typically 10 to 15 amplifiers), the accumulated tilt can be as high as 20 dB. In the case of a standard EDFA, the amplifier gain is flat if the gain is set to is nominal value. The different tap couplers of the amplifier allow to measure the gain of the first and second stage, and the VOA is adjust to achieve the nominal value of the gain.

Different sources of unflatness can be noted:

Due to the inaccuracy of the photodiode, the gain is not exactly set to is nominal value.

Due to the non-uniform loss of the span between 1530 nm and 1562 nm, the spectrum at the input is not flat, so even if the gain of the amplifier is perfectly flat, a tilt is created. The difference of loss can be 1 dB between 1530 nm and 1560 nm for a long span of 100 km.

Due to the high power sent in the span, there is an energy transfer between the lower wavelength of the spectrum to the higher wavelength thanks to the Raman effect. If the input power is as high as 23 dB, the tilt can be higher than 2 dB for the C Band. (If the system uses C+L Band, the tilt can be higher than 3 dB).

For this reason, some amplifiers are now designed to generate more gain at lower wavelength than at higher wavelength (in the case of the C-Band, the amplifier gain is higher at 1529 nm than at 1562 nm by 1 or 2 dB).

In order to avoid to sum the error of 1.5 dB for the tilt adjustment at each amplifier; the ASE noise is measured at the two extremities of the optical bandwidth of the amplifier. The VOA or the VASC (Variable Slope Compensator) at the interstage is adjusted in order to minimized the tilt on the ASE noise. The tilt on the ASE noise is linked with the tilt of the signal (because the NF of the EDFA is nearly flat on the bandwidth of the optical amplifier).

If the amplifier has been designed to generate more gain at lower wavelength than at the higher wavelength, the ASE noise measured at the lower wavelength has to be larger than the ASE noise at the higher wavelength.

One solution to adapt gain tilt over a WDM system is disclosed in U.S. Pat. No. 6,160,659. In detail an apparatus is disclosed which receives an input light having a spectrum, and determines a momental wavelength of the spectrum. The apparatus includes a decoupling unit, a weighting unit and a computation unit. The decoupling unit decouples a portion of the received input light, to provide a first signal representing the input light with the portion decoupled there from, and a second signal representing the decoupled portion. The weighting unit weights the second signal. The computation unit determines the momental wavelength from the power of the first signal and the power of the weighted second signal. An optical amplifier is also provided which determines the momental wavelength of an amplified light, and controls a gain tilt parameter of the optical amplifier in accordance with the determined momental wavelength, to reduce gain tilt. The momental wavelength is determined by measuring the ASE (Amplified Spontaneous Emission) of the fiber amplifier. The apparatus described in this prior art must work in a "full loaded" status to derive the parameter for momemtal wavelength. This means that all channels of a the wavelength multiplex must be active and loaded with signals. For a system without signals or with a limited use of several channels only the apparatus of U.S. Pat. No. 6,160, 659 does not help.

SUMMARY OF THE INVENTION

Accordingly, it is an object of the present invention to provide a method and apparatus for monitoring the gain tilt of an optical amplifier or for monitoring the spectrum of light also in cases where the wavelength channels are not fully loaded.

In order to minimized the tilt of the spectrum after a succession of a lot of amplifiers, the tilt is measured thanks to the ASE power measurement at the extremities of the spectrum, and is minimized by adjusting the Variable Optical Attenuator (VOA) or the VASC in the interstage of the amplifier.

Measuring the ASE noise signals allows to derive a control signal for adjusting the VOA or VASC independent of the signals in the channels. The measurement of two signals at the extremity of the noise signals allows a simple calculation of tilt figure.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

Figure 1:
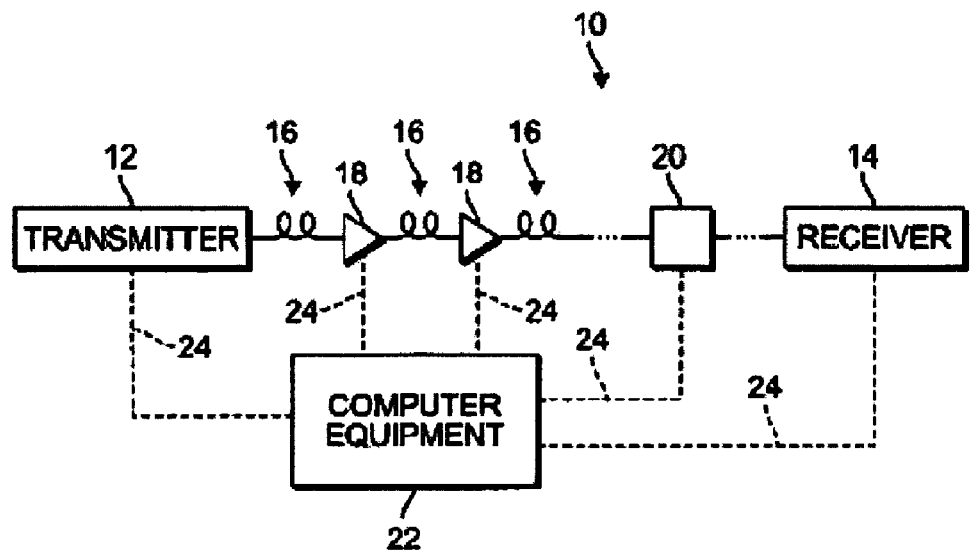
FIG. 1 is a diagram illustrating a transmission system comprising a tilt control unit

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1527–1605 nm. These are merely illustrative system characteristics. If desired, fewer channels may be provided (e.g., one channel), more channels may be provided (e.g., hundreds of channels), signals may be carried on multiple wavelengths, signals may be modulated at slower or faster data rates (e.g., at approximately 2.5 Gbps for OC-48 or at approximately 40 Gbps for OC-768), and different carrier wavelengths may be supported (e.g., individual wavelengths or sets of wavelengths in the range of 1240–1670 nm).

Optical amplifiers 18 may be used to amplify optical signals on link 10. Optical amplifiers 18 may include booster amplifiers, in-line amplifiers, and preamplifiers. Optical amplifiers 18 may be rare-earth-doped fiber amplifiers such as erbium-doped fiber amplifiers, amplifiers that include discrete Raman-pumped coils, amplifiers that include pumps for optically pumping spans of transmission fiber 16 to create optical gain through stimulated Raman scattering, semiconductor optical amplifiers, or any other suitable optical amplifiers.

Link 10 may include optical network equipment such as transmitter 1 2, receiver 14, and amplifiers 18 and other optical network equipment 20 such as dispersion compensation modules, dynamic filter modules, add/drop multiplexers, optical channel monitor modules, Roman pump modules, optical switches, performance monitors, etc.

Computer equipment 22 may be used to implement a network management system. Computer equipment such as computer equipment 22 may include one or more computers or controllers and may be located at network nodes and one or more network management facilities. As indicated by lines 24, the network management system may communicate with optical amplifiers 18, transmitter 12, receiver 14 and other optical network equipment 20 using suitable communications paths. The communications paths may be based on any suitable optical or electrical paths. For example, communications paths 24 may include service or telemetry channel paths implemented using spans 16, may include wired or wireless communications paths, may involve communications paths formed by slowly modulating the normal data channels on link 10 at small modulation depths, etc. Paths 24 may also be used for direct communications between amplifiers 18 and other optical network equipment.

Computer equipment 22 may be used to gather spectral information from transmitter 12 (e.g., an output power spectrum), receiver 14 (e.g., a received power spectrum), and amplifiers 18 and other equipment 20 (e.g., input and output power spectra and gain spectra).

If amplifiers 18 or other equipment in link 10 have spectral adjustment capabilities, computer equipment 22 may use the gathered spectral information to determine how the spectra of amplifiers 18 and the other equipment in link 10 are to be controlled. Computer equipment 22 may issue commands to amplifiers 18, transmitters 12, receivers 14, and other equipment 20 that direct this equipment to make appropriate spectral adjustments. The spectral adjustments may be used to optimize the gain or signal spectrum flatness along link 10, may be used to optimize the end-to-end or node-to-node signal-to-noise ratio across the signal band or spectrum, or may be used to implement any other suitable control or optimization functions for link 10.

Spectral adjustments may be made in the output power of transmitter 12, in the input power for receiver 14 by adjusting a dynamic filter or variable optical attenuators before the received signals are processed by the detectors in receiver 14.

Spectral adjustments in equipment 20 and amplifiers 18 may be made using dynamic filter arrangements, tilt controllers, individual variable optical attenuators, variable optical attenuator arrays, gain stage adjustments, other suitable spectral adjustment arrangements, or combinations of these arrangements.

Figure 2:
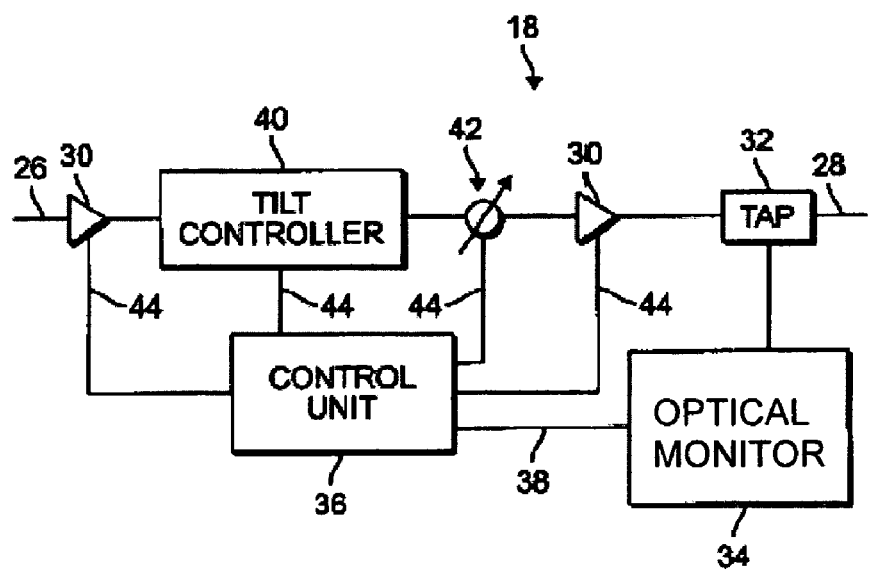
FIG. 2 is a schematic tilt control unit

An illustrative amplifier 18 is shown in FIG. 2. Optical signals from a span of fiber 16 may be provided to input fiber 26. Corresponding amplified output signals may be provided at output fiber 28. Optical gain may be provided by gain stages such as gain stages 30. Gain stages 30 may include, for example, one or more coils of optically-pumped rare-earth-doped fiber such as erbium-doped fiber. Pumps such as laser diode pumps or other suitable sources of pump light may be used to optically pump the erbium-doped fiber or other rare-earth-doped fiber in stages 30. Gain stages 30 that include multiple optically-pumped coils or gain media may be considered to include multiple gain substages. There may be any suitable number of gain stages 30 in amplifier 18.

A DCF is usually put in the interstage of a double stage EDFA, between the VOA 42 and the second stage 30.

The gain spectra of rare-earth-doped fiber such as erbium-doped fiber is not intrinsically flat. Accordingly, gain flattening filters may be used in one or more of gain stages 30 to modify the spectral shape of amplifier 18. For example, in erbium-doped fiber amplifiers 18, gain shaping or flattening filters may be used in one or more of gain stages 30 to help flatten or otherwise shape the gain spectrum of amplifier 18.

Tap 32 may be used to tap optical signals travelling along the main fiber path through amplifier 18. Tap 32 may be any suitable optical tap such as a 2%/98% wavelength-insensitive tap.

Tapped light from the fiber at output 28 may be provided to optical channel monitor 34. Optical monitor 34 or an external optical monitor in communication with amplifier 18 over paths 24 (FIG. 1) may make optical power measurements on tapped signals. In the arrangement of FIG. 2, optical monitor 34 may be used to measure the output ASE power spectrum of amplifier 18. The gain spectrum of amplifier 18 may be measured in parallel on a channel-by-channel or an integral basis by using optical monitor 34 to measure tapped input light from input 26. The gain spectrum may be determined by dividing the measured input power spectrum into the measured output power spectrum. If desired, an optical switch may be used to allow a single optical monitor such as monitor 34 to measure both input and output power spectra. Any suitable optical monitoring arrangement may be used if desired.

Power information that is gathered by optical monitor 34 may be provided to control unit 36 over path 38. Control unit 36 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Control unit 36 may be electrically coupled to a dynamic spectral tilt controller 40 or, a variable optical attenuator 42, and gain stages 30 using paths 44. This allows control unit 36 to control the operation of tilt controller 40, variable optical attenuator 42, and gain stages 30 to adjust the spectrum of amplifier 18 based on the optical signal measurements made using optical monitor 34 or an external optical channel monitor. Control unit 36 may adjust the settings of variable optical attenuator 42 to produce different amounts of attenuation (e.g., 1 dB, 2 dB, etc.). Variable optical attenuator 42 may be used, for example, when the pump power levels in gain stages 30 are being adjusted to accommodate different input power levels at input fiber 26.

(In an EDFA, we have either a VOA or a VASC, but it is not necessary to have a VOA and a VASC. Both have the same interest: controlling the tilt of the amplifier. In a classic amplifier with near 35 dB gain and over a 32 nm bandwidth of the C-Band, if the attenuation of the VOA is increased by 5 dB, this generate a tilt of near 5 dB.

U.S. Pat. No. 6,434,318 discloses an example of a VOA device: a variable optical attenuator is provided having at least one elongated core, a cladding surrounding the core, and a controllable thermal source and a heat sink arranged on opposite sides of the core and defining there between a first or vertical axis oriented transversely to the longitudinal axis of the core. The core and cladding collectively form a conventional waveguide structure, which normally confines optical energy propagating along the longitudinal axis of the core by virtue of the difference in refractive indices between the core and cladding. The core and cladding materials are preferably selected such that their thermo-optic coefficients (i.e., dn/dT, where n is the local refractive index and T is temperature) are closely matched within the ambient temperature range of interest. Matching the thermo-optic coefficients of the core and cladding ensures that the waveguide confinement (a function of the difference between the refractive indices of the core and cladding) is substantially invariant with respect to ambient temperature, thereby obviating the need to provide heating or cooling of the waveguide package.

When attenuation of the optical energy propagating along the core is desired, a control signal is applied to the thermal source, which in turn causes a temperature gradient to be developed along the first (vertical) axis extending between the thermal source and the heat sink. The temperature gradient results in a "tilted" or asymmetric refractive index profile within the core wherein the refractive index of the core increases along the first axis from the proximal core-cladding boundary (the boundary nearer to the thermal source) to the distal core-cladding boundary (the boundary more remote from the thermal source). Extraction of optical energy from the waveguide occurs when the local refractive index at the higher-temperature areas of the core (those adjacent the proximal boundary) is depressed below that of the local refractive index of the cladding immediately adjacent to the distal core-cladding boundary. This condition causes at least a portion of the optical energy propagating along the core to be transversely deflected in the direction away from the thermal source (i.e., toward the heat sink). The amount of optical energy extracted from the waveguide is controlled by adjusting the signal (for example, a voltage) applied to the thermal source. VOA are very common in optical transmission and a lot of technologies, as MEMS for example, can be used.

If desired, other components may be used to adjust the spectrum of amplifier 18. For example, a dynamic gain equalization filter may be used that produces desired filter spectra in response to commands from control unit 36. The dynamic filter may be used with or without using variable optical attenuator 42.

Tilt controller 40 may be used to introduce various amounts of spectral tilt into the spectrum of amplifier 18. Tilt controller 40 need not have the ability to produce an arbitrary filter spectrum of the type that may be produced by a dynamic gain equalization filter. Rather, tilt controller 40 may be used to make slope adjustments to the gain or output power spectrum of amplifier 18.

The fixed gain flattening filter in gain stages 30 may be used to perform most of the flattening of the erbium-doped fiber gain spectrum of stages 30. Variable optical attenuator 42 and the pump powers in gain stages 30 may also be controlled to make spectral adjustments by changing the inversion levels in stages 30. Tilt controller 40 may be used to change the tilt or slope of the amplifier spectrum. In general, using tilt controller 40 to make spectral tilt adjustments for amplifier 18 instead of only using pump adjustments and variable optical attenuator adjustments may tend to reduce the total level of attenuation that is produced by variable optical attenuator 42 under certain input power loading conditions. As a result, the noise figure performance of a given amplifier 18 may be improved by using tilt controller 40 to make at least some portion of the spectral adjustments made in amplifier 18, rather than relying exclusively on attenuation adjustments made using variable optical attenuator 42.

Although the example of FIG. 2 shows how tilt controller 40 may be used in an optical amplifier, this is merely illustrative. Tilt controller 40 may be used in any suitable optical network equipment 20 (FIG. 1) if desired.

Figure 3:
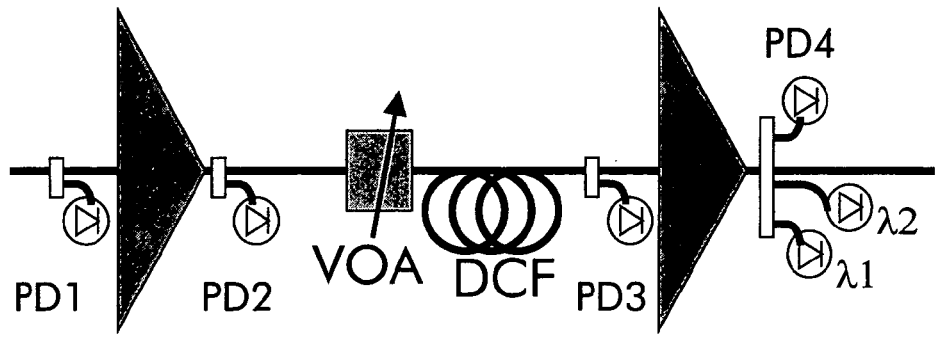
FIG. 3 is a solution according to the invention

A first preferred embodiment of the invention is described in FIG. 3. The input 26 is connected to a first photodiode PD1 to measure the input power level for the optical monitor 34. The second photodiode PD2 after the first gain stage 30 of the amplifier 18 is also connected to feed the signal to the optical monitor 34. Via a VOA 42 the output signal of the first gain stage is connected to a second stage 30 and a third photodiode PD3 measuring the input power level of the second stage. The output power level after the second stage of the amplifier is measures with a fourth photodiode PD4 at the output 28. Parallel to the signal power measurement the power level of two extreme ASE wavelengths are tapped from the signal output 28.

The measurement of the ASE noise power located at the extremity of the spectrum (at $\lambda 1=1529$ nm and at $\lambda 2=1562$ nm for the C band for example) after each amplifier 18 allows to measure the tilt of the whole system at this point. The VOA 42 (or the VASC) is adjusted until the difference of power between the two measured levels of ASE noise is zero.

The photodiodes PD1, PD2, PD3 and PD4 which are indicated in FIG. 3 are suitable to measure the absolute power level but it is not necessary for the invention to have them all.

The power of the ASE noise at $\lambda 1$ and $\lambda 2$ is measured at the end of the amplifier, just before the transmission line.

Figure 4:
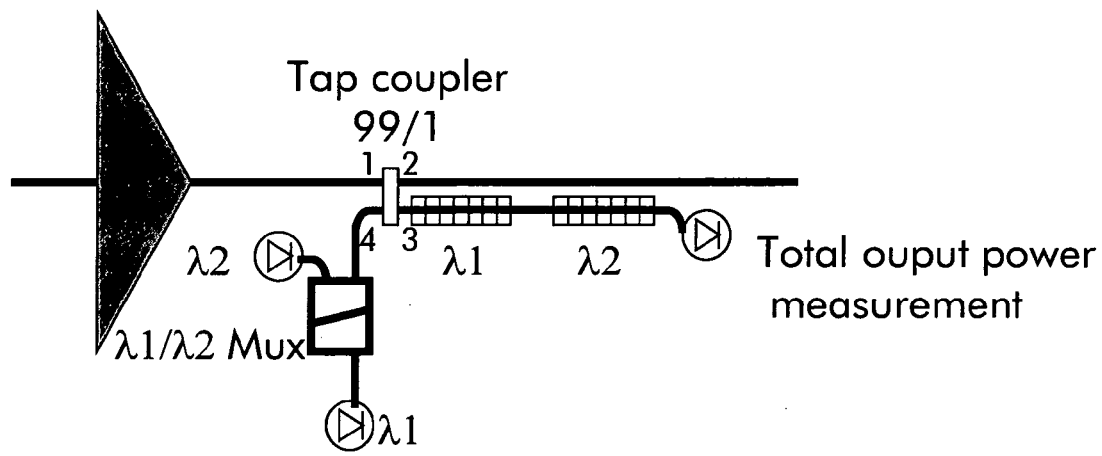
FIG. 4 shows a second embodiment of the invention

A way to measure the output power of the amplifier and the power of each wavelength is shown in FIG. 4. The output signal of the second stage of the amplifier is linked to a tap coupler 44 which has for example a tap ration of 99/1. The tap coupler comprises four ports, port 1 is linked to the output of the gain stage 30, port 2 is linked to the transmission line, port 3 is linked to Bragg gratings and port 4 to a wavelength multiplexer 47. The two Bragg gratings 45 and 46 reflect the wavelengths $\lambda 1$ and $\lambda 2$ respectively. The reflected light come back to the port 4 of the coupler, 99% of the light is sending to the port 4 and 1% is sent back to the port 1. A wavelength multiplexer in form e.g. of a thin film filter is be used to separate the wavelength $\lambda 1$ and $\lambda 2$ and to sent them on photodiodes for $\lambda 1$ and $\lambda 2$.

If the EDFA is used in an hybrid configuration with a Raman preamplifier, the total gain is shared between the Raman amplifier and the Erbium amplifier. If the spectrum at the output of the EDFA is tilted, the feedback can be done on the Raman amplifier instead of adjusting the VOA or the VASC.

If the power in the upper part of the C-Band ($\lambda_2=1561$ nm for example) is higher than the power in the lower part of the C-Band ($\lambda_1=1529$ nm for example), the Raman gain can be reduced or the attenuation provide by the VOA can be increased.

If the power in the upper part of the C-Band ($\lambda_2=1561$ nm for example) is lower than the power in the lower part of the C-Band ($\lambda_1=1529$ nm for example), the Raman gain can be increased or the attenuation provide by the VOA can be reduced.

Each amplifier takes into account the tilt accumulated by all the transmission line. If the tilt of the amplifier is reduced, the transmission system 10 is more tolerant. For the system design longer spans of fiber without regeneration are possible. With an active adaptation of tilt the use of Raman amplifier may avoided and also the use of Dynamic Gain Equalizer (DGE)—At least a reduction of the number of DGE for Ultra Long Haul systems is achieved.

The solution of measuring two wavelengths in the ASE noise spectrum allows the use of VASC in the interstage of EDFA (because the solution give a good signal feedback for the flatness of the EDFA). The interest of the VASC is to reduce the NF of the EDFA if the input power is higher than the nominal input power.

Figure 5:
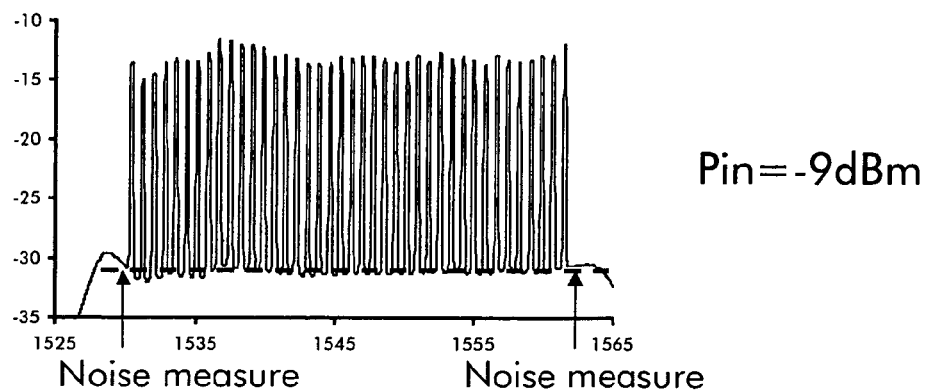
FIGS. 5–7 shows a measurement of spectra An illustrative communications link 10 in an optical communications network is shown in FIG. 1. A transmitter 12 may transmit information to a receiver 14 over a series of fiber paths. Each fiber path may include a span 16 of optical transmission fiber. Fiber spans 16 may be on the order of 40–100 km in length for long-haul networks or may be any other suitable length for use in signal transmission in an optical communications network. Link 10 may be a point-to-point link, part of a fiber ring network, or part of any other suitable network or system.
Figure 6:
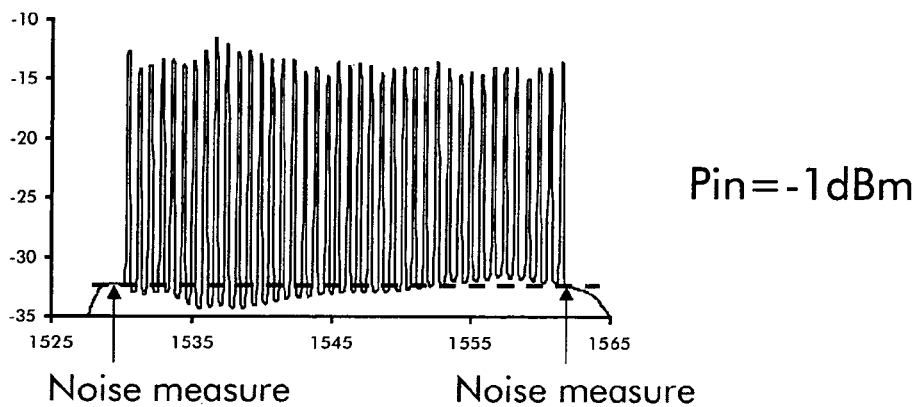
Figure 7:
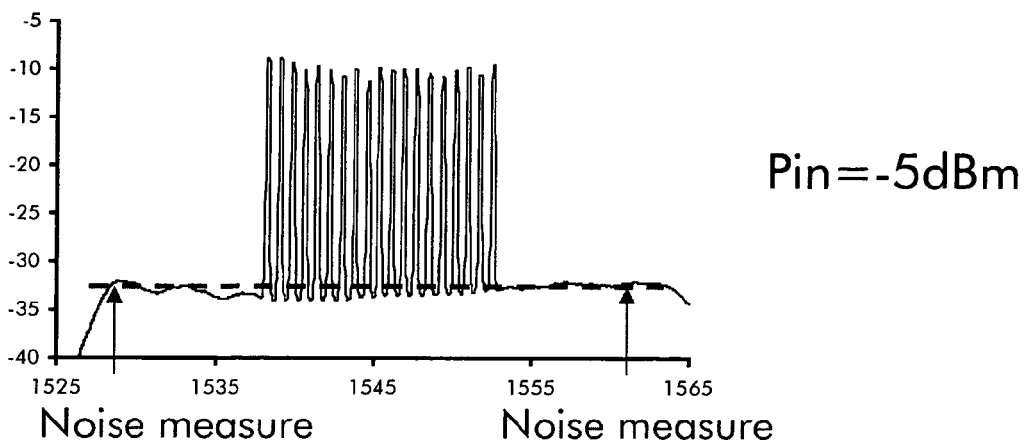

FIGS. 5 to 7 show the result of spectrum measurements for signal power of Pin=−9 dBm, −1 dBm and for a not fully loaded wavelength multiplex using only 20 channels in the center part of the amplifier wavelength.

The invention claimed is:

1. An optical amplifier that amplifies signal light in a signal band in a fiber optic transmission system, the optical amplifier comprising:
   first and second optically pumped signal light gain amplifying stages,
   a tilt controller linked to a control unit and linked between the first and second optically pumped signal light gain amplifying stages, and
   an optical monitor analyzing signal powers, wherein the optical monitor measures an amplified spontaneous emission of the optical amplifier at two extreme wavelengths of the signal band, and
   a control unit which controls at least the tilt controller and the first and second optically pumped signal light gain amplifying stages to adjust a spectrum of the optical amplifier, based on the measured amplified emission.

2. The optical amplifier according to claim 1, further comprising a variable optical attenuator linked to the tilt controller, the second optically pumped signal light gain amplifying stage, and the control unit.

3. The optical amplifier according to claim 1, further comprising a variable attenuation slope compensator linked to the tilt controller, the second optically pumped signal light gain amplifying stage, and the control unit.

4. The optical amplifier according to claim 1, wherein the first and the second gain stages comprise doped fiber amplifiers.

5. The optical amplifier according to claim 1, wherein the first gain stage is a Raman amplifying stage and the second gain stage amplifier is a doped fiber amplifier.

6. The optical amplifier according to claim 1, wherein an output signal of the amplifier is connected to a four-port tap coupler, where one port is linked to Bragg fiber gratings reflecting the extreme wavelengths of amplified spontaneous emission noise and one port connected to a wavelength multiplexer separating the wavelengths for a measurement.

7. A fiber optic communication system comprising at least one optical amplifier that amplifies signal light in a signal band, the optical amplifier comprising:
   first and second optically pumped signal light gain amplifying stages,
   a tilt controller linked to a control unit and linked between the first and second optically pumped signal light gain amplifying stages, and
   an optical monitor analyzing signal powers, wherein the optical monitor measures an amplified spontaneous emission of the optical amplifier at two extreme wavelengths of the signal band, and
   a control unit which controls at least the tilt controller and the first and second optically pumped signal light gain amplifying stages to adjust a spectrum of the optical amplifier, based on the measured amplified emission.

8. A method for controlling tilt of a fiber optic communication system comprising an optical amplifier that amplifies signal light in a signal band, the method comprising:

measuring at an output of the amplifier two wavelength extremities of the signal band out of an amplified spontaneous emission noise signal, analyzing the measured signals in an optical monitor of the amplifier, generating control signals via a control unit based on the measured signals and providing the control signals to at least to a tilt controller and first and second optically pumped signal light gain amplifying stages of the amplifier, and adapting the tilt according to the control signals to adjust a spectrum of the amplifier.

* * * * *